US006263916B1

United States Patent
Rumpf

(10) Patent No.: US 6,263,916 B1
(45) Date of Patent: Jul. 24, 2001

(54) TANK SYSTEM

(75) Inventor: Bernd Rumpf, Nidderau (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/462,187

(22) PCT Filed: Jun. 19, 1998

(86) PCT No.: PCT/EP98/03754

§ 371 Date: Apr. 20, 2000

§ 102(e) Date: Apr. 20, 2000

(87) PCT Pub. No.: WO99/01309

PCT Pub. Date: Jan. 14, 1999

(30) Foreign Application Priority Data

Jul. 1, 1997 (DE) .............................. 197 27 923

(51) Int. Cl.⁷ ................................................ F16K 37/00
(52) U.S. Cl. .................... 137/558; 137/392; 137/574; 137/576
(58) Field of Search .................. 137/558, 392, 137/574, 576

(56) References Cited

U.S. PATENT DOCUMENTS

| | | | | |
|---|---|---|---|---|
| 3,181,557 | * | 5/1965 | Lannan, Jr. ........................ | 137/392 |
| 3,279,380 | * | 10/1966 | Clark ................................... | 137/558 |
| 4,325,894 | * | 4/1982 | Date et al. .......................... | 137/392 |
| 4,928,657 | * | 5/1990 | Asselin ................................ | 123/514 |
| 5,979,485 | * | 11/1999 | Tuckey et al. ..................... | 137/143 |

FOREIGN PATENT DOCUMENTS

| | | |
|---|---|---|
| 3224919 | 1/1984 | (DE) . |
| 0795739 | 9/1997 | (EP) . |

* cited by examiner

Primary Examiner—A. Michael Chambers
Assistant Examiner—Thomas L. McShane
(74) Attorney, Agent, or Firm—Mayer, Brown & Platt

(57) ABSTRACT

In a tank system, in particular a fuel tank system, which comprises a tank (1) with at least one filling level transmitter (7, 8) and also a display (11) for indicating the filling level of the tank (1), a measurable and indicatable reserve volume (3V) which is arranged in the tank and is always refuelable as a priority via an inflow pipe (2) and the content of which is available as a fuel reserve when a minimum filling level is reached in the main tank (1), a switching means (7, 12) for activating, by means of a control unit (10), an indicator (17, 18) signaling operation on fuel reserve (=extraction of fuel from the reserve), and a splash pot (3), together with fuel pump (5), arranged in the main tank (1), according to the invention the measurable and indicatable reserve volume (3V) is the content of the splash pot (3) itself.

20 Claims, 1 Drawing Sheet

TANK SYSTEM

BACKGROUND

1. Field of the Invention

The invention relates to a tank system, in particular a fuel tank system having a splash pot and a filling level sensor, and to a method for controlling and operating such a tank system.

2. Related Art

It has already been proposed, for example, in German Application no. 196 10 154.9) to provide, within the main tank of a motor vehicle, an additional or reserve volume which is always filled up as a priority and which is automatically released by means of a switchable valve, as required (lowering of the filling level of the main tank below a predetermined minimum value). In order to improve the driver's information on the fuel supply available, simultaneously with the release of the reserve a signal indicating this operation and/or an accurately indicating or high-definition addition indication of the residual fuel quantity is activated. The vehicle driver can consequently estimate the remaining range of his vehicle more accurately. Use is made, in this case, of the fact that the geometry of the additional volume is simpler than that of present-day main tanks, since, with a view to optimum space utilization, these sometimes have a highly angular shape and therefore make it difficult to detect and indicate the filling level accurately.

The reserve supply is released into the main tank or into a splash pot, preferably directly on the suction side of the fuel pump. The additional volume is filled preferably directly from the inflow pipe (also tank filler neck).

It is normally located directly above the tank bottom and is always kept full. For refilling during operation, for example, suction jet pumps are used, which are operated by forward or return fuel streams and convey a volume flow constantly out of the main tank into the splash pot. There are also solutions with two-stage fuel pumps, the first stage of which feeds out of the main tank into the splash pot and the second stage of which then delivers from the splash pot to the carburetor or injection pump.

Excess quantities run over the upper edge of the splash pot back into the main tank. Suitable means (splash pot plates, labyrinth systems) prevent the splash pot from being emptied unintentionally, even when the vehicle undergoes high accelerations or decelerations. In the known system, admittedly, the changeover of the reserve release valve is controlled by a filling level limit switch arranged in the splash pot itself. Although it must be assumed that the splash pot will always be full if there is a sufficient supply of fuel in the main tank, in this configuration the possibility cannot be ruled out that, in the event of a merely temporary lack of fuel in the splash pot, the reserve volume is released prematurely and is then used up by the time the next refueling occurs.

Furthermore, a measuring device for tanks in motor vehicles is known, which possesses a main sensor arranged in a main tank and a secondary sensor for the filling level arranged in a secondary tank, as described in German Patent no. 32 24 919 A1). The volume present in the secondary tank serves as a reserve and is indicated. However, the indicated reserve is dependent on a filling level signal from the main sensor in the main tank. Since only the one measuring point is present in the main tank, the main sensor delivers signals which, depending on driving situations, are different from the actual filling level. The reserve indicator therefore also gives situations which differ from the actual filling level.

SUMMARY OF THE PRESENTLY PREFERRED EMBODIMENTS

The object on which the invention is based is to improve even further the fuel tank system initially described and to specify an improved method for controlling and operating a tank system.

Regarding the device features, this object is achieved, according to the invention, by means of a fuel tank system having a tank with at least one filling level transmitter and a display for indicating the filling level of the tank; a measurable and indicatable reserve volume which is arranged in the tank and is always refuelable as a priority via an inflow pipe, and the content of which is available as a fuel reserve when a minimum filling level is reached in the main tank; a switching means for activating, by means of a control unit, an indicator signaling operation on fuel reserve; a splash pot which is arranged in the main tank and the content of which is capable of being sucked in by a fuel pump; the content of the splash pot being the measurable and indicatable reserve volume; wherein, in addition to the filling level transmitter, at least one further level transmitter for detecting a lack of fuel, said level transmitter being connected to the control unit, is provided in the tank near the bottom. The tank system is appreciably simplified and therefore becomes less complicated if the content of the splash pot is utilized directly as the reserve volume.

It is then possible not only to omit the separate additional volume, but also to dispense with the controlled release of the reserve volume by the switching of a valve. It goes without saying that the splash pot must be designed with a sufficient volume content, in order to ensure a minimum range during operation on fuel reserve.

A further advantageous effect of this arrangement is that, when new vehicles are filled for the first time, generally only a small fuel volume has to be introduced, but the ultimate purchaser is not left in doubt as to the potential remaining range of the new vehicle on account of the improved indication.

The tank system is automatically controlled and operated as follows: in the event of a lack of fuel in the main tank, a preferentially filled reserve volume is released automatically to the fuel pump fed from the splash pot; and the changeover to operation on fuel reserve and the available reserve volume and/or a remaining range are indicated by means of indicator elements which are capable of being activated by a control unit evaluating measurement signals; wherein the lack of fuel in the main tank is detected by means of a filling level transmitter and at least one additional level transmitter and corresponding signals are interlinked and evaluated in the control unit; during or after changeover to operation on fuel reserve, the control unit activates a level sensor arranged within the splash pot and evaluates the signal from said level sensor in order to indicate the reserve volume formed by the splash pot content itself.

The splash pot has preferably a sufficient volume to ensure a predetermined remaining range, for example 100 km or more, solely with its initial content. It is particularly advantageous as regards the driver's information if a continuously measuring filling level sensor is provided in the splash pot, because the actual reserve level can therefore be detected accurately as a result of the relatively simple geometry of the splash pot and can be displayed by means of the following indicator instrument. This sensor is advantageously used and activated only on fuel reserve, so that a long service life may be expected. On the other hand, the improved indication of the reserve enables the vehicle driver to utilize more effectively the fuel supply and the actual range of the vehicle, so that, where appropriate, even shorter travel times are achieved due to longer refueling intervals.

It seems particularly advantageous that, because of the improved indication of the reserve, the conventional fuel supply indicator instrument can be designed with a relatively low definition and therefore inexpensively, since differentiated and highly accurate indication becomes possible in the critical area of operation on fuel reserve. This indication may be displayed digitally in plain text so as to be capable of being read off particularly simply, whilst the low-definition indicator may be designed as a simple analog instrument. A scale changeover from low-definition to spread-out fine-definition division may alternatively also be provided.

A possibly even more convenient indicator function can be achieved if a remaining range can be indicated directly from a fuel consumption measurement, so that the vehicle driver is given a clear distance to go before reaching the nearest filling station.

The tank system in the design explained above is not only suitable for use in motor vehicles, but may be employed wherever high operating reliability depends on accurate information on a remaining level of operating fluid.

Further details and advantages of the subject of the invention and its functioning may be gathered, without any restriction being intended, from the drawing of an exemplary embodiment and from the accompanying drawing description which follows.

DETAILED DESCRIPTION OF THE PRESENTLY PREFERRED EMBODIMENT

Figure 1:
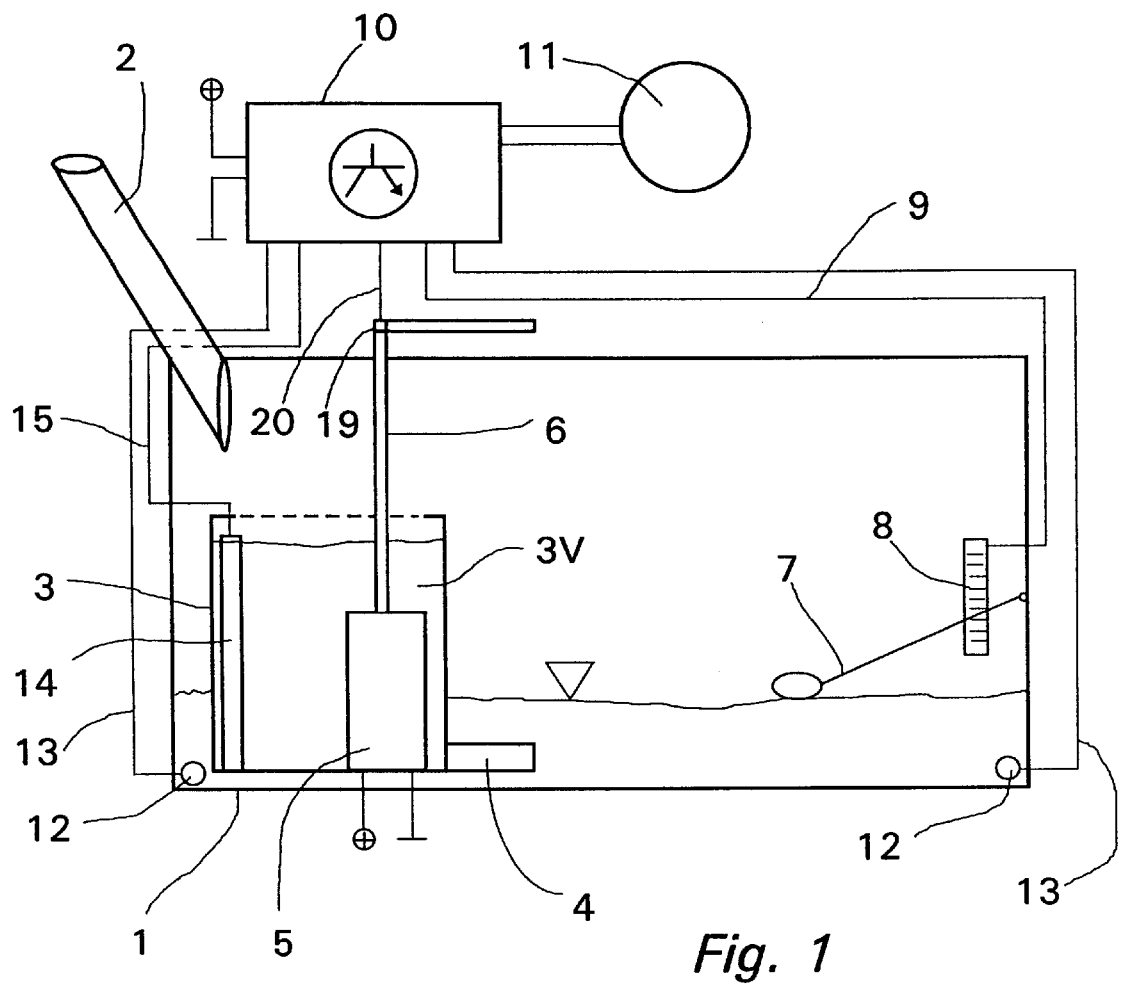
FIG. 1 shows an overall diagrammatic view of the tank system.

According to FIG. 1, a fuel receptacle or tank 1 is the main component of the tank system. It is capable of being filled via a closeable inflow pipe 2. An upwardly open splash pot 3 is arranged in the bottom region of the tank 1 in such a way that, during refueling, said splash pot is filled as a priority. Excess fuel then flows over the upper edge of the splash pot away into the tank 1. For refilling the splash pot 3 as a "tank in tank" constantly during operation, a pumping means 4 is indicated merely diagrammatically in the tank 1, near the bottom, on a splash pot wall. Said pumping means may be designed in a known way as a suction jet pump. It may, however, also be designed as the first stage of a preferably electrically driven fuel pump 5 arranged in a known way in the splash pot 3. Said fuel pump sucks away fuel directly from the splash pot 3 near the bottom, in order to convey the fuel, via a forward line 6, to the motor which is not shown here. The pump 5 and the splash pot 3 may form a preassemblable fuel feed unit in a way known per se.

Measures for limiting the splashing of fuel out of the splash pot 3 are not illustrated in any more detail here for the sake of simplification. They are nevertheless present and may comprise, for example, an overflow or nonreturn valve. Labyrinth-like overflow cross sections on the circumferential edge of the splash pot may also be provided.

A filling level transmitter (float) 7 is provided in the tank 1 in a likewise known way, said filling level transmitter generating electric signals analogous to the current filling level (for example, by means of a potentiometer 8 or by means of another suitable displacement or angle transducer) and sending these signals via a line 9 to a control unit 10. The latter controls the conventional fuel supply indicator or display 11 at the driver's place in the vehicle. The display 11 could per se also be connected directly to the filling level transmitter in a known way. In light of the improved indication of the reserve quantity, the connection mentioned first is not absolutely necessary, but is advantageous.

In addition to the filling level transmitter 7, a plurality of level switches 12 are also provided in the tank 1 near the bottom, said level switches being provided for the reliable detection of a lack of fuel and for changing over the active display indicator and supplying their electric output signals via lines 13 to the control unit 10. The level switches will be arranged so as to be away from the filling level transmitter 7, in particular in the edge regions of the tank bottom.

The evaluation of the signals from these level switches and their arrangement are to be designed and interlinked in such a way that there is a changeover to operation on fuel reserve and the fuel reserve indicator is activated only when this is necessary with a sufficient degree of certainty, not prematurely on account of the unavoidable splashing of the fuel shortly before a low level is reached. This may be achieved for example, using delay elements.

A short delay in the onset of the "tank empty" state is acceptable, because it may be assumed that the splash pot is normally always full and the feed of the fuel pump on empty cannot occur immediately.

In particular, it is recommended to have a combined evaluation of the signals from the filling level transmitter 7 and from the level switches 12 which, being interconnected, are also to be considered as a switching means 7, 12 for operation on fuel reserve. A minimum condition for operation on fuel reserve is that the filling level transmitter and the level switches simultaneously indicate a lack of fuel (AND operation).

Finally, a level sensor 14 is provided in the splash pot 3 for the accurate measurement and indication of the splash pot content or of a reserve volume 3V, the electric output signal from said level sensor being supplied, in turn, to the control unit 10 via a line 15. This level sensor 14, preferably designed as an electrothermal transmitter, does not have to be kept constantly active, since its signal is required only in the event of a lack of fuel in the tank 1. It is therefore sufficient to activate it only to switch on the reserve indicator during operation on fuel reserve.

It may be noted that the lines 13, 15, 20 indicated merely diagrammatically here represent both the actual signal lines for the individual sensors and their supply lines which, if appropriate, are required.

Figure 2:
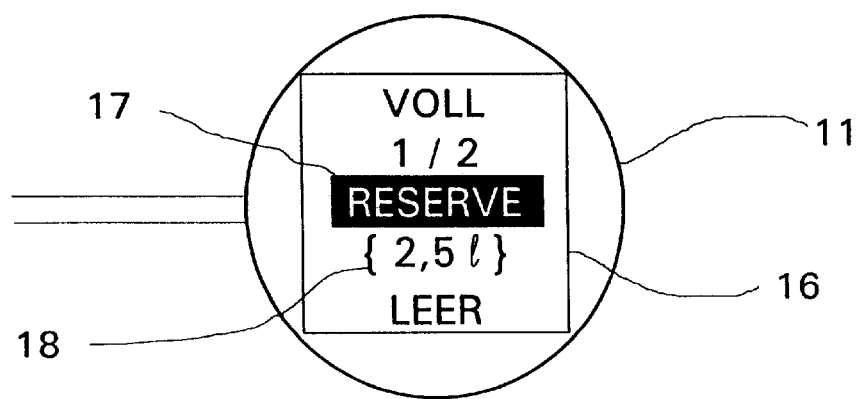
FIG. 2 shows a design of a filling level and reserve display as a detail from FIG. 1.

After the reserve indicator has been switched on at the latest, the vehicle driver receives, as illustrated in FIG. 2, an accurate indication, controlled by the signal on the line 15, of the residual content of the splash pot by means of the display 11 which has differentiated indication.

Said display comprises the customary letter-field indicators 16, scaled at most with low-quality definition according to FULL, ½ and EMPTY, and at least one warning field 17 for fuel reserve operation (for example, capable of being illuminated by a conspicuous warning lamp or being given clearly visible emphasis in another way). The letter-field indicators 16 may be swept in a known way by an analog pointer, not illustrated, or be represented by color contrasts without any mechanical components. As already mentioned, the low-definition indicator may, in principle, also be connected directly to the filling level transmitter ⅞ without a detour via the control unit (for example, in the known form of a bimetallic element capable of being supplied via the potentiometer 8 with voltage values variable as a function of the filling level).

A separate indicator field 18 for the reserve volume digitally indicates a residual quantity of 2.5 l here. The operating instructions for the vehicle equipped in this way will refer to the maximum distance which it is still possible to cover when this volume reserve indicator is activated. As a result of the measures already mentioned against the splashing of fuel in the splash pot, because the latter has a relatively small cross section there is no likelihood of the signal on the line 15 being falsified. However, suitable damping of the fuel reserve indicator 18 against dynamic signal components will, of course, be provided.

Direct remaining range indication as a function of the current fuel consumption or quantity and range indication, combined, may also be provided, if consumption can be determined with sufficient accuracy, for example in a fuel injection system, and the control unit 10 is programmed with algorithms suitable for this purpose. These features are represented in simplified form in the drawing by a flowmeter 19 and its connection 20 to the control unit 10.

The design or layout of the fuel reserve indicator may employ all suitable forms, that is to say also use, for example, a high-definition analog indicator instead of the digital display shown here.

The display 11 may also be designed in such a way that the lettering "reserve" and the quantity indication are normally invisible. A separate warning lamp may then be dispensed with, if appropriate, since the imminent lack of fuel and the short remaining range become obvious due to these indicator parts becoming visible.

Finally, the normal filling level indication may also be induced to fade out completely in a particularly conspicuous way and only the fuel reserve indication, together with high-definition filling level and/or a range indication, become visible.

In contrast to the compact design shown here for the sake of simplification, the normal fuel indicator and the fuel reserve display may also be spatially separated from one another or take the form of a spatial arrangement modified in any desired way, in keeping with the respective individual vehicle design. At all events, at least the fuel reserve indicator will expediently be arranged conspicuously at a particularly exposed point.

In conclusion, the functioning and control of this modified tank system will also be dealt with in summary, starting from a filling operation, with the tank 1 empty.

The fuel flows through the inflow pipe 2 directly into the splash pot 3 and preferentially fills up the latter or the reserve volume 3V contained in it. During further filling, the fuel subsequently flows over the upper edge of the splash pot 3 into the main tank. The level transmitters 12 and the filling level transmitter 7 respond. When the vehicle is started up (the master switch switched on) at the latest, the display will indicate the current filling level.

If only the splash pot has been filled with a small quantity of fuel, as a result of the absence of signals, or signals indicating a lack of fuel, from the transmitters 7 and 12 the fuel reserve indication and the remaining quantity become visible immediately in the display 11. If, by contrast, the tank 1 has likewise been filled at least partially, the normal function of the display 11, without the indication of fuel reserve, by means of the indicator elements 16 commences.

Only when the tank has been emptied again to an extent such that the combination of the output signals from the transmitters 7 and 12 implies a permanent lack of fuel again, does the fuel reserve indicator 17, 18 come into operation again. At the same moment, the level sensor 14 in the splash pot 3 is activated, so that the control unit 10 receives a measurement signal via the line 15. Said control unit will then switch on the relevant indicator in the display 11 and set it to the residual quantity or remaining range in accordance with the sensor signals.

This indication may be continuously updated directly by the measurement of the reserve volume 3V in the splash pot 3 and/or indirectly by the detection of the current fuel consumption and corresponding evaluation in the control unit 10.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A tank system, in particular fuel tank system, comprising a tank with at least one filling level transmitter and also a display for indicating the filling level of the tank, a measurable and indicatable reserve volume which is arranged in the tank and is always refuelable as a priority via an inflow pipe and the content of which is available as a fuel reserve when a minimum filling level is reached in the main tank, a switching means for activating, by means of a control unit, an indicator signaling operation on fuel reserve, a splash pot which is arranged in the main tank and the content of which is capable of being sucked in by a fuel pump, the content of the splash pot being the measurable and indicatable reserve volume, wherein, in addition to the filling level transmitter, at least one further level transmitter for detecting a lack of fuel, said level transmitter being connected to the control unit, is provided in the tank near the bottom.

2. The tank system as claimed in claim 1, wherein the splash pot, capable of being filled up directly via the inflow pipe, has a sufficiently large volume for a predeterminable remaining range.

3. The tank system as claimed in claim 1, wherein the splash pot has arranged in it a level sensor which continuously detects its content.

4. The tank system as claimed in claim 3, wherein the level sensor is capable of being switched off and on as a function of the filling level of the tank by means of the control unit and is activated only when there is a lack of fuel.

5. The tank system as claimed in claim 1, wherein a first display for the indication of the filling level and a special reserve indicator for indicating operation on fuel reserve and/or the remaining reserve volume and/or the remaining range are provided and are capable of being controlled by the control unit in accordance with measurement signals.

6. The tank system as claimed in claim 5, wherein the fuel reserve indicator is provided for digitally indicating a quantity and/or a range indication.

7. The tank system as claimed in claim 1, wherein the splash pot and the fuel pump form a preassemblable fuel feed unit.

8. The tank system as claimed in claim 5, wherein the fuel reserve indicator is invisible during normal operation and becomes visible only at changeover.

9. The tank system as claimed in claim 5, wherein a means for detecting the current consumption is provided and is connected to the control unit, the latter evaluating the signal from the means in order to represent a remaining range directly on the display.

10. A method for automatically controlling and operating a tank system, comprising:

in the event of a lack of fuel in the main tank, a preferentially filled reserve volume is released automatically to a fuel pump fed from a splash pot, and a changeover to operation on fuel reserve and the available reserve volume and/or a remaining range are indicated by means of indicator elements which are capable of being activated by a control unit evaluating measurement signals, wherein the lack of fuel in the main tank is detected by means of a filling level transmitter and at least one additional level transmitter and corresponding signals are interlinked and evaluated in the control unit, during or after changeover to operation on fuel reserve, the control unit activates a level sensor arranged within the splash pot and evaluates the signal from said level sensor in order to indicate the reserve volume formed by the splash pot content itself.

11. The method as claimed in claim 10, wherein the control unit changes over to operation on fuel reserve only when the signals from the filling level transmitter and from the at least one level transmitter indicate a permanent lack of fuel.

12. The method as claimed in claim 11, wherein the changeover to operation on fuel reserve is delayed in time in relation to the onset of a "tank empty" signal state.

13. A fuel tank system comprising:

a main tank having at least one fuel level transmitter;

a display for indicating the fuel level of the tank;

a reserve tank which is arranged in the main tank and is refueled before the main tank is refueled via an inflow pipe, the content of the reserve fuel tank is available as a fuel reserve when a minimum fuel level is reached in the main tank; and a control unit including a switching means for activating an indicator that signals the use of fuel from the reserve tank.

14. The fuel tank system as claimed in claim 13, wherein the reserve tank comprises a splash pot within the main tank, the content of the splash pot feeding a fuel pump within the splash pot.

15. The fuel tank system as claimed in claim 13, further comprising at least one additional fuel level transmitter, said level transmitter being within the tank near the bottom and connected to the control unit.

16. The fuel tank system as claimed in claim 14, wherein the splash pot contains a level sensor for detecting the fuel level in the splash pot.

17. The fuel tank system as claimed in claim 16, further comprising a first display for indicating the fuel level of the main tank and a reserve indicator for indicating use of fuel from the reserve tank.

18. The fuel tank system as claimed in claim 17, wherein the reserve indicator indicates the fuel level of the reserve tank.

19. The fuel tank system as claimed in claim 14, wherein the splash pot and the fuel pump comprise a preassemblable fuel feed unit.

20. The fuel tank system as claimed in claim 17, wherein the fuel reserve indicator is not visible during normal operation and becomes visible only when indicating use of fuel from the reserve tank.

* * * * *